United States Patent [19]
Yamamoto

[11] Patent Number: 5,980,841
[45] Date of Patent: Nov. 9, 1999

[54] METHOD FOR RECOVERING REUSABLE ELEMENTS FROM RARE EARTH-NICKEL ALLOY

[75] Inventor: Kazuhiro Yamamoto, Kobe, Japan

[73] Assignee: Santoku Metal Industry Co., Ltd., Hyogo-Ken, Japan

[21] Appl. No.: 08/799,092

[22] Filed: Feb. 11, 1997

[30] Foreign Application Priority Data

Feb. 13, 1996 [JP] Japan ................................. 8-025554

[51] Int. Cl.⁶ ........................................ C01F 17/00
[52] U.S. Cl. .................... 423/21.1; 423/263; 205/365
[58] Field of Search .................. 423/21.1, 263, 423/150.1, 150.3; 205/365

[56] References Cited

FOREIGN PATENT DOCUMENTS

| 63-004028 | 1/1988 | Japan | 423/21.1 |
| 63-182216 | 7/1988 | Japan | 423/21.1 |
| 5-287405 | 11/1993 | Japan | 423/21.1 |

OTHER PUBLICATIONS

Translation of JP 05–287405, Nov. 1993.
Translation of JP 63–182216, Jul. 1988.

*Primary Examiner*—Steven Bos
*Attorney, Agent, or Firm*—Darby & Darby

[57] ABSTRACT

A method for recovering reusable elements including rare earth elements from a rare earth-nickel alloy is disclosed, including the steps of:

preparing a slurry of the rare earth-nickel alloy, adding a diluted nitric acid solution to the slurry over a period of time under stirring at a temperature not higher than 50° C. while maintaining pH of a resulting mixture at 5 or higher to dissolve soluble metals including rare earth metals, and separating an undissolved residue containing nickel from a rare earth-containing nitrate solution by filtration.

14 Claims, 1 Drawing Sheet

METHOD FOR RECOVERING REUSABLE ELEMENTS FROM RARE EARTH-NICKEL ALLOY

BACKGROUND OF THE INVENTION

The present invention relates to a method for economically recovering reusable elements including rare earth elements from a rare earth-nickel alloy.

PRIOR ART

Application of a rare earth-nickel alloy to a hydrogen storage vessel, a heat pump, or the like has recently been studied due to its high hydrogen storage capacity. As one example of this application, the rare earth-nickel alloy has increasingly been used as an anode of a nickel-hydrogen battery. The rare earth-nickel alloy usually contain cobalt, and optionally aluminum, manganese, or the like.

Such nickel-hydrogen battery, for example, has a service life, and disposal of the used battery may cause pollution. Further, scrap and slug generated in the course of production of the batteries contain a large quantity of expensive reusable metal elements. Therefore, it is urgently demanded to recover such reusable elements. Conventionally known methods for recovering reusable elements include: (1) a method for recovering rare earth elements (Japanese Patent Publication No. 7-72312); (2) a method for recycling rare earth element-containing alloy (Japanese Laid-open Patent Application No. 2-22427); and (3) a method for recovering reusable metals from nickel-hydrogen rechargeable battery (Japanese Laid-open Patent Application No. 6-340930).

However, these publicly known methods have various defects for processing a large quantity of alloy at low cost.

In (1) Japanese Patent Publication No. 7-72312, there is disclosed to dissolve rare earth element-containing alloy at pH 3 to 5 in the presence of an oxidant, thereby selectively leaching rare earth elements. If this method is applied to a rare earth-iron alloy within this pH range using hydrochloric acid, it is possible to dissolve only the rare earth elements. However, if this method is applied to a rare earth-nickel alloy, not only rare earth metals but also all the other metals including nickel are dissolved. Thus, the merit of this method over the conventional recovering method wherein all the metals are dissolved in an acid, cannot be achieved. Further, this publication describes nothing about a method for recovering rare earth elements from a rare earth-nickel alloy.

In (2) Japanese Laid-open Patent Application No. 2-22427, there is disclosed a method for recycling a rare earth element-containing alloy wherein the entire alloy is dissolved in an acid to separate rare earth elements, followed by precipitation of materials of the master alloy by adjusting pH of the solution. Thus, this method requires a large amount of acid. Further, this application describes nothing about a method for recovering rare earth elements from a rare earth-nickel alloy.

In (3) Japanese Laid-open Patent Application No. 6-340930, there is disclosed a method for recovering a rare earth-nickel hydrogen storage alloy used in an anode of a nickel-hydrogen rechargeable battery. As a part of this method, there is disclosed a method for recovering nickel by dissolving entire alloy in an acid and precipitating and separating the rare earth elements as fluorides. This method also requires a large amount of acid. Further, since the rare earth fluorides are precipitated from a solution containing a lot of nickel ions, purity and yield of the rare earth elements are inferior, thus being not economical.

In the above methods, the rare earth elements are recovered by dissolving the rare earth element-containing alloy in an acid. In most of the cases, hydrochloric acid is used as the acid, and the concentration of the acid is designed at a high level with the pH of not higher than 5 so that the metals may dissolve readily and quickly. Under such conditions for dissolving, the use of hydrochloric acid may cause generation of hydrogen gas, which gives rise to risk of explosion, and residence of chloride in the recovered metals, which leads to poor quality of the obtained metals. It is known that, if nitric acid is used as the acid, unique reactions shown below as the formulae (1) and (2) will occur in the reaction system, which are different from the reaction of hydrochloric acid. Here, NO generated in the reaction is associated with air to give highly toxic $NO_2$ gas of brown color.

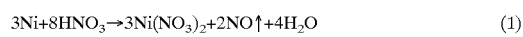

$$3Ni + 8HNO_3 \rightarrow 3Ni(NO_3)_2 + 2NO\uparrow + 4H_2O \quad (1)$$

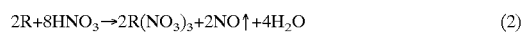

$$2R + 8HNO_3 \rightarrow 2R(NO_3)_3 + 2NO\uparrow + 4H_2O \quad (2)$$

(wherein R stands for a rare earth element such as La or a mixture thereof.)

Further, nitric acid is expensive, but excess acid is required upon dissolving. Thus, it has not been considered proper to use nitric acid when the process should be carried out at low cost.

It is known that rare earth metals for use in an anode of a nickel-hydrogen rechargeable battery is produced by a molten salt electrolysis method using a fluoride bath. This method is known to be employed also in a method for recovering reusable elements from a rare earth-nickel alloy (Japanese Laid-open Patent Application No. 6-340930). In this case, when the entire alloy components in the material subjected to the treatment are dissolved in an acid, precipitated as carbonates or the like, and calcined to give an oxide, this oxide has the same composition as the alloy components in the material initially subjected to this treatment, for example, including 46% by weight of nickel, 34% by weight of rare earth elements, 11% by weight of cobalt, 8% by weight of manganese, and 1% by weight of aluminum. In order to electrolyze this oxide by the molten salt electrolysis method to obtain molten metals, the temperature for the electrolysis should be as high as 1400° C. or even higher. Therefore, it is proposed to perform the molten salt electrolysis at a temperature not higher than 1000° C. by admixing fresh rare earth oxides with the above oxide so that the weight ratio of rare earth elements to transition metals in the mixture is 50:50 to 90:10, preferably 60:40 to 80:20. However, if the required quantity of the fresh rare earth oxides to be admixed is large, the amount of the recovered metal exceeds the initial amount of the metal to be recovered, and thus the balance of the amount between the starting material and the product is destroyed.

SUMMARY OF THE INVENTION

Therefore, it is an object of the present invention to provide a method for recovering reusable elements from a rare earth-nickel alloy through which the reusable elements can be recovered economically with safety.

According to the present invention, there is provided a method for recovering reusable elements including rare earth elements from a rare earth-nickel alloy comprising the steps of:

preparing a slurry of the rare earth-nickel alloy, adding a diluted nitric acid solution to said slurry over a period of time under stirring at a temperature not higher than 50° C. while maintaining pH of a resulting mixture at 5 or higher to dissolve soluble metals including rare earth metals, and separating an undissolved residue containing nickel from a rare earth-containing nitrate solution by filtration.

According to the present invention, there is further provided the above method further comprising the steps of:

adding a fluorine compound to said separated rare earth-containing nitrate solution to precipitate rare earth fluorides, and separating said precipitated rare earth fluorides from a nitrate solution containing residual metals by filtration.

According to the present invention, there is further provided the above method further comprising the steps of:

adding a component selected from the group consisting of oxalic acid, ammonium oxalate, and mixtures thereof to said separated rare earth-containing nitrate solution to precipitate rare earth oxalates, and separating said precipitated rare earth oxalates from a nitrate solution containing residual metals by filtration.

According to the present invention, there is further provided the above method further comprising the steps of:

adding a component selected from the group consisting of ammonium hydrogencarbonate, ammonium carbonate, alkali carbonate, and mixtures thereof to said separated rare earth-containing nitrate solution to precipitate rare earth elements and transition metals contained in the rare earth-containing nitrate solution as carbonates, respectively, separating said precipitate by filtration, calcining said precipitate to obtain an oxide, mixing said oxide with additional rare earth oxides so that a weight ratio of rare earth elements to transition metals including nickel in a resulting mixture is 50:50 to 90:10, processing said mixture by a molten salt electrolysis method using a fluoride bath to obtain a rare earth-nickel master alloy.

PREFERRED EMBODIMENT OF THE INVENTION

Figure 1:
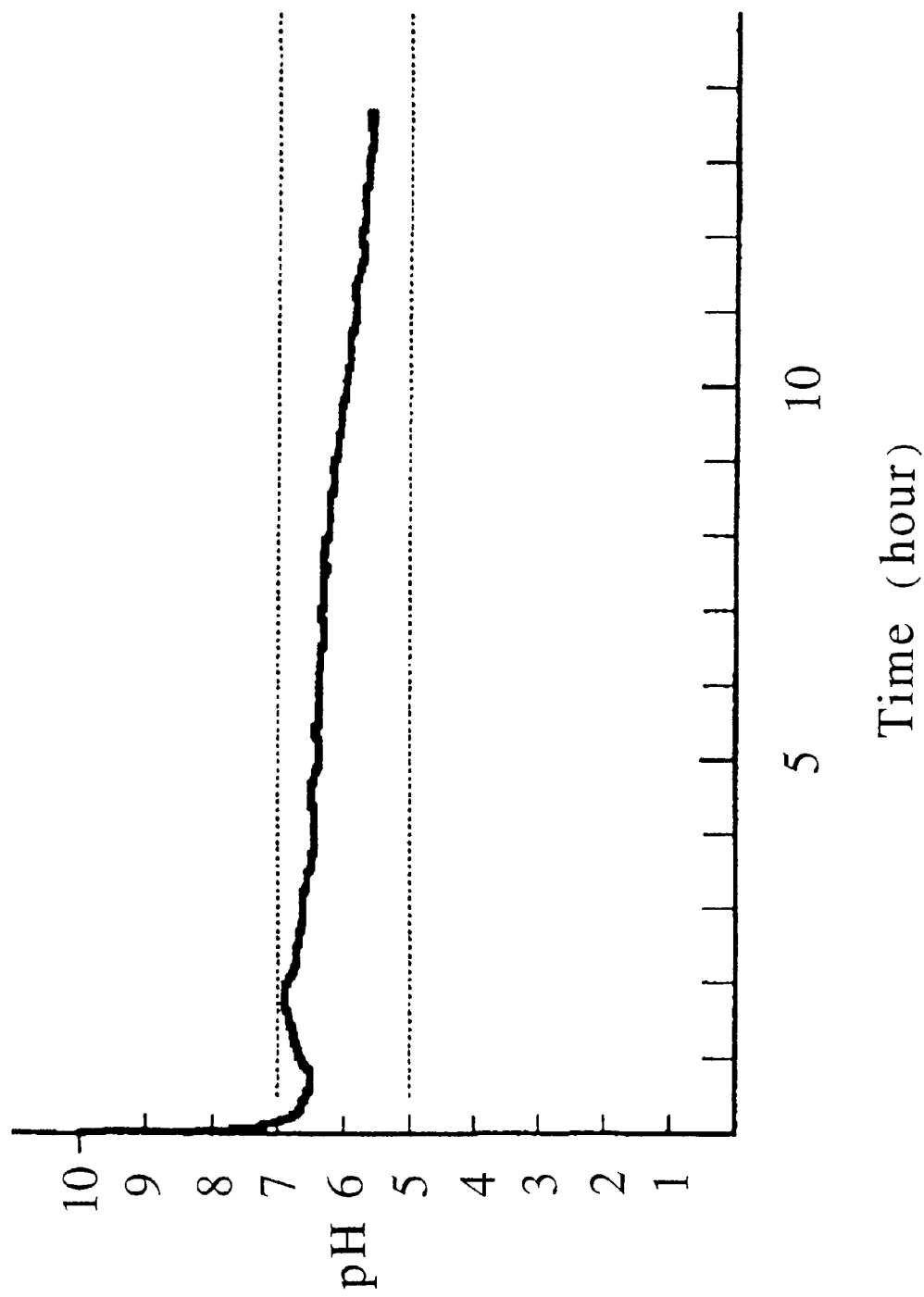
FIG. 1 is a graph showing change in pH value of the slurry during the reaction by adding a diluted nitric acid solution in Example 1.

In the method of the present invention, first a slurry of a rare earth-nickel alloy is prepared. As the rare earth-nickel alloy, alloy wastes, powdered anode material of a battery, or slug generated in the course of production of an alloy for an anode of a nickel-hydrogen rechargeable battery may be used. The rare earth-nickel alloy contains rare earth metals, nickel, and usually cobalt, and may optionally contain Al, Mg, Ti, Cr, Mo, W, Ga, Hf, Zr, and a variety of other inevitably contained elements. Examples of the rare earth metals may include La, Ce, Pr, Nd, or mixtures thereof, or misch metal (Mm).

The slurry may be prepared by pulverizing the rare earth-nickel alloy such as alloy wastes, powdered anode material of a battery, slug or the like into powders having average particle size of preferably 1 to 50 $\mu$m, and suspending the powders in water. The pulverization may be carried out by a conventional pulverizer, but it is preferred to use a wet ball mill since the alloy itself is highly ignitable. Alternatively, a publicly known method wherein the alloy is pulverized by hydrogenation is also preferred. The pulverization may not necessarily be carried out when the rare earth-nickel alloy is in a powdered state with the desired particle size. The suspension of the powders in water may preferably be carried out so that the concentration of the metals in the suspension is 300 to 600 g/liter.

In the method of the present invention, a diluted nitric acid solution is added to the slurry over a period of time under stirring. The stirring is not particularly limited as long as the diluted nitric acid solution is mixed with and dissolved in the slurry.

The diluted nitric acid solution has concentration of preferably not higher than 39 wt %, more preferably 21 to 28 wt % of nitric acid based on the solution. That is, the diluted nitric acid solution may be prepared by diluting a nitric acid solution for industrial use having concentration of 67 to 68 wt % with water of the same volume as the nitric acid solution or more, preferably of two to three times the volume of the nitric acid solution. If the volume of the water used to dilute the nitric acid solution is less than the volume of the nitric acid solution, the nitric acid added to the slurry may be decomposed to generate toxic NO gas (which is further converted into toxic $NO_2$ gas upon contacting with air).

The diluted nitric acid solution is continuously added to the slurry over a period of time, preferably over 5 to 20 hours, first in a theoretical amount required for dissolving rare earth metals contained in the slurry; or, for example, if the slurry contains other metals soluble in nitric acid such as cobalt in addition to the rare earth metals, in a theoretical amount required for dissolving rare earth metals and such metals. In this process, nickel starts precipitating as an insoluble nickel oxyhydroxide near pH 7. Since the dissolution is exothermic, the temperature of the mixture rises. Preferably, the temperature of the mixture is monitored all the time, and preferably the addition of the diluted nitric acid to the slurry is stopped for a while at the time point when the temperature of the mixture exceeds 40° C., and resumed when the temperature is declined below 40° C. On the other hand, pH of the mixture is also preferably monitored all the time, and preferably the addition of the diluted nitric acid to the slurry is stopped at the time point when the pH of the mixture is about 5.5. If pH drops below 5, this means that excess amount of nitric acid is uneconomically contained in the diluted nitric acid solution added. In this case, the nitric acid may be decomposed to generate toxic $NO_2$ gas. Therefore, pH of the mixture should be maintained at 5 or higher. Further, in order to maintain the pH at 5 or higher, the temperature of the mixture should be maintained at 50° C. or lower. Even after the addition of the diluted nitric acid solution is completed, stirring is preferably continued for 1 to 5 hours to complete the dissolution of the soluble metals including rare earth metals.

The above reactions until the completion of the dissolution are explained with reference to the reaction formulae hereinbelow.

In a slurry of rare earth-nickel alloy, some of the rare earth metals exposed on the surface of the alloy particles react with water in accordance with the following formulae to become hydroxides, a portion of which is further dissociated. Thus, pH of the slurry is usually not lower than 7.

  (3)

  (4)

The present inventors have reached a novel findings that when the diluted nitric acid solution is added to the slurry under the above conditions, the reactions represented by the formulae below are proceeded, in the light of the results of experiments.

$$R(OH)_3 + 3HNO_3 \rightarrow R(NO_3)_3 + 3H_2O \tag{5}$$

$$8R + 30HNO_3 \rightarrow 8R(NO_3)_3 + 3NH_4NO_3 + 9H_2O \tag{6}$$

If the rare earth metals remain in the slurry near pH 7, the rare earth nitrates are hydrolyzed as represented by the formula (7), and generated nitric acid is used in the reaction represented by the formula (6)

$$R(NO_3)_3 + 3H_2O \rightarrow R(OH)_3 + 3HNO_3 \tag{7}$$

In other words, in the presence of nitric acid, the following formula (8) is obtained from the formulae (6) and (7).

$$8R + 6HNO_3 + 15H_2O \rightarrow 8R(OH)_3 + 3NH_4NO_3 \tag{8}$$

Accordingly, rare earth metals may safely be changed to rare earth hydroxides with only a small quantity of nitric acid without hydrogen being generated. The rare earth hydroxides generated react according to the formula (5) as the amount of the nitric acid added increases, and dissolve as rare earth nitrates without hydrogen gas being generated, unlike the reaction wherein hydrochloric acid is used as the acid.

On the other hand, it is also found that nickel contained in the slurry is precipitated through a behavior which is different from the conventionally known reaction. The obtained precipitate is dried, and analyzed by an X-ray diffraction device manufactured by RIGAKU CORPORATION to reveal that the precipitate is a mixed salt of nickel oxyhydroxide and nickel hydroxide.

That is, when the diluted nitric acid solution is added to the slurry little by little under stirring, pH of the slurry changes around 7, and reactions proceed according to the formulae (9) and (10) below.

$$3Ni + 2HNO_3 + 3H_2O \rightarrow 2NiOOH + Ni(OH)_2 + NH_4NO_3 \tag{9}$$

$$4Ni + 2HNO_3 + 5H_2O \rightarrow 4Ni(OH)_2 + NH_4NO_3 \tag{10}$$

In this process, it is probable that the reactions represented by the formulae (9) and (10) proceed simultaneously, and a precipitate of nickel oxyhydroxide and nickel hydroxide is generated.

If cobalt is contained in the slurry, most of the cobalt is dissolved in the rare earth-containing nitrate solution in accordance with the formula (11) below, but some cobalt become a hydroxide, and coprecipitate with nickel oxyhydroxide.

$$4CO + 10HNO_3 \rightarrow 4Co(NO_3)_3 + NH_4NO_3 + 3H_2O \tag{11}$$

Further, if aluminum and manganese are contained in the slurry, these elements are precipitated as insoluble hydroxides.

Incidentally, regarding the above formulae (6), (8), (9), (10), and (11), $NH^{4+}$ in the mixture has been confirmed of its presence and quantitatively analyzed by an ion-exchange chromatograph analyzer manufactured by YOKOGAWA ANALYTICAL SYSTEMS INC.

The above reaction of dissolving the metals is exothermic, and thus the temperature of the mixture is increased with the progress of the reaction. If the temperature of the mixture exceeds 50° C., nitric acid in the added diluted nitric acid solution is decomposed as represented by the formula (12) to generate toxic $NO_2$ gas.

$$2HNO_3 \rightarrow 2NO_2\uparrow + H_2O + \tfrac{1}{2}O_2\uparrow \tag{12}$$

Therefore, it is necessary to proceed with the reaction with the temperature of the mixture being controlled at 50° C. or lower. The control of the temperature may be carried out by stopping the addition of the diluted nitric acid for a while to give off the heat, or by decreasing the adding rate of the diluted nitric acid. If the treatment is to be carried out in a large scale, it is preferred to effect the reaction in a dissolving vessel fitted with a cooling device.

The reaction products generated by the process are composed of nickel oxyhydroxide, insoluble hydroxide of aluminum, and occasionally hydroxide of a portion of cobalt and hydroxide of manganese as precipitates, and a rare earth-containing nitrate solution wherein rare earth elements, and occasionally cobalt and a portion of nickel are dissolved as nitrates. The reaction products may be filtered by a conventional filter press or the like method to separate the precipitates from the solution. Since the precipitate contains reusable nickel, the precipitate may be dissolved in hydrochloric acid or sulfuric acid according to the conventional chemical process to recover a solution of nickel chloride or nickel sulfate.

According to the method of the present invention, a fluorine compound is added to the above rare earth-containing nitrate solution to precipitate rare earth fluorides, and the precipitated rare earth fluorides are separated from the nitrate solution occasionally containing residual cobalt and the like by filtration.

The fluorine compound may be added to the rare earth-containing nitrate solution preferably in the form of a solution, such as a solution of acid ammonium fluoride, a solution of hydrofluoric acid, or the like. The concentration of the solution of the fluorine compound is preferably 0.5 to 5 N, and the amount of the solution of the fluorine compound to be added is preferably 1.1 to 1.3 equivalent of the rare earth elements contained in the rare earth-containing nitrate solution in terms of the fluorine ions.

After the rare earth fluorides are precipitated, the separation of the precipitated rare earth fluorides from the nitrate solution containing the residual metals by filtration may be carried out, for example, by first neutralizing the nitrate solution containing the precipitate with aqueous ammonia or the like to adjust the pH to 3 to 4, and then separating the precipitate by filtration using a conventional filtering device such as a filter press.

The separated rare earth fluorides may suitably be used as a bath salt material for electrolysis to produce rare earth metals by drying the separated rare earth fluorides at 200 to 500° C. for 1 to 10 hours to convert the same into rare earth fluoride anhydrides.

On the other hand, in the filtrate nitrate solution from which the rare earth fluorides have been separated by filtration, cobalt and a portion of nickel are occasionally dissolved as a cobalt nitrate and nickel nitrate. Thus, the cobalt and the nickel may be separated by adding soda ash (sodium carbonate) or caustic soda (sodium hydroxide) to the filtrate nitrate solution to precipitate cobalt carbonate and nickel carbonate, or cobalt hydroxide and nickel hydroxide, and separating the precipitate by filtration. The obtained cobalt hydroxide, nickel hydroxide, and the like may be dissolved in hydrochloric acid to recover a cobalt chloride solution, a nickel chloride solution, and the like.

According to the method of the present invention, oxalic acid and/or ammonium oxalate is added to the above rare earth-containing nitrate solution to precipitate rare earth oxalates, and the precipitated rare earth oxalates are separated from the nitrate solution containing residual metals by filtration.

The oxalic acid and/or ammonium oxalate is added to the rare earth-containing nitrate solution preferably in the form of a solution of 1 to 5 N or powders. The amount of the oxalic acid and/or ammonium oxalate to be added is preferably 1.1 to 1.3 equivalent of the rare earth elements contained in the rare earth-containing nitrate solution in terms of oxalic acid.

After the rare earth oxalates are precipitated, the separation of the precipitated rare earth oxalates from the nitrate solution containing residual metals such as cobalt or a portion of nickel by filtration may be carried out, for example, by neutralizing the nitrate solution containing the precipitate with aqueous ammonia or the like to adjust the pH to 3 to 4 for completing the precipitating reaction. Subsequently, the precipitate is separated by filtration using a conventional filtering device such as a filter press.

The separated rare earth oxalates may suitably be used as materials for electrolysis to produce rare earth metals by calcining the separated rare earth oxalates at 500 to 1100° C. to convert the same into rare earth oxides.

On the other hand, in the filtrate nitrate solution from which the rare earth oxalates have been separated by filtration, cobalt and a portion of nickel are occasionally dissolved as nitrates. Thus, the cobalt and the nickel may be separated by adding soda ash or caustic soda to the filtrate nitrate solution as described above to precipitate cobalt carbonate and nickel carbonate, or cobalt hydroxide and nickel hydroxide. The precipitates may further be dissolved in hydrochloric acid to recover a cobalt chloride solution, a nickel chloride solution, and the like.

According to the method of the present invention, ammonium hydrogencarbonate, ammonium carbonate, alkali carbonate, or a mixture of these compounds is added to the above rare earth-containing nitrate solution to precipitate the rare earth elements and transition metals contained therein as carbonates; the precipitate is separated by filtration; the separated precipitate is calcined to obtain oxides; the oxides are mixed with additional rare earth oxides so that the resulting mixture has the particular weight ratio of rare earth elements to transition metals including nickel; and the mixture is processed by a molten salt electrolysis method using a fluoride bath, thereby obtaining a rare earth-nickel master alloy.

The amount of the ammonium hydrogencarbonate, ammonium carbonate, alkali carbonate, or a mixture of these compounds to be added is preferably 1.1 to 1.5 equivalent of the amount necessary to precipitate all the metal ions present in the rare earth-containing nitrate solution. By adding this amount, the rare earth elements and the transition metals such as nickel and cobalt dissolved in the rare earth-containing nitrate solution can be precipitated as carbonates.

The precipitated carbonates are separated by filtration, and calcined to obtain oxides. The calcining may preferably be carried out at 500 to 1000°C.

The mixing of the oxides with additional rare earth oxides so that the resulting mixture has a particular weight ratio of rare earth elements to transition metals containing nickel may preferably be carried out by analyzing the oxides by ICP atomic emission spectrochemical analysis or the like method to determine the ratio of rare earth elements to transition metals therein, and admixing the additional rare earth oxides so that the weight ratio of rare earth elements to transition metals including nickel in the resulting mixture is 50:50 to 90:10, preferably 60:40 to 80:20.

Subsequently, the obtained mixture is processed as a starting material by a molten salt electrolysis method using a fluoride bath, thereby obtaining a rare earth-nickel master alloy. The molten salt electrolysis method using a fluoride bath may be carried out in a conventional manner. For example, a mixed salt of rare earthfluorides ($RF_3$), lithium fluoride (LiF), and barium fluoride ($BaF_2$) is used as the fluoride bath with the preferred weight ratio of $RF_3$:LiF:$BaF_2$ being 1:0.1 to 0.4:0.08 to 0.3. The above mentioned starting material may be introduced into a molten salt electrolysis apparatus with this fluoride bath, and electrolyzed at 700 to 1000° C., thereby obtaining a rare earth-nickel master alloy.

Incidentally, if the master alloy is to be recovered by dissolving the entire alloy subjected to the treatment in an acid and electrolyzing using the fluoride bath, it is necessary to add the additional rare earth oxides in not less than 1.2 times the amount of the recovered oxides by weight. On the contrary, in the present invention, the amount of the additional rare earth oxides required is not more than one time the amount of the recovered oxides by weight. Thus, the balance of the starting material and the product in electrolysis is improved.

According to the method of the present invention, soluble metals including rare earth elements may be recovered as nitrates from wastes, scrap, sludge, or the like of rare earth-nickel alloys used as rare earth hydrogen storage alloys by separating the soluble metals from precipitate of undissolved elements including nickel highly efficiently. Further, the rare earth elements may be recovered as fluorides or oxides for use as starting materials for producing the same alloy, and the nickel, cobalt, or the like may be recovered as reusable chlorides. Moreover, by using nitric acid, which has not been used because of the problems of pollution and high cost, only in a small amount required for dissolving substantially the soluble metals including rare earth elements, the reusable elements can be recovered more efficiently and more economically than conventional methods.

EXAMPLES

The present invention is now described in more detail with reference to Examples and Comparative Examples, but the present invention is not limited thereto.

Example 1

Anode metal sludge of used nickel-hydrogen rechargeable batteries having the metallic composition of 33.8 wt % of rare earth elements in the form of misch metal (mixed rare earth metals), 45.9 wt % of nickel, 11.4 wt % of cobalt, 1.3 wt % of aluminum, and 7.6 wt % of manganese, was measured out to contain 500 g of metallic components. The particle size of the sludge was measured by MICROTRAC PARTICLE-SIZE ANALYZER (trade name) manufactured by Leeds & Northrup Co. to reveal that the average particle size of the sludge was 11 μm. Thus, the sludge was charged as it was into a dissolving vessel fitted with a stirrer, and mixed with water to prepare 1 liter of a slurry of the sludge. Then a 5 N nitric acid solution (volume ratio of the nitric acid solution for industrial use to water is 1:1.89) was added to and dissolved in the slurry at the rate of 5 ml/min. under stirring. After 40minutes from the start of the addition, the temperature of the mixture exceeded 40° C., so that the addition of the nitric acid solution was stopped, and the dissolving reaction was continued only by stirring After the lapse of 1 hour of stirring, the temperature of the mixture declined to 35° C., and thus the addition of the nitric acid solution was resumed at the rate of 5 ml/min. When the pH of the mixture was declined to 5.5, the addition of the nitric acid solution was stopped. Only the stirring was continued for additional 2 hours, and the reaction was completed. The total amount of the nitric acid solution added to the slurry was 3110 ml. The pH of the mixture from the start until the end of the addition of the nitric acid solution was maintained at 5 or higher as shown in FIG. 1. The temperature of the mixture from the start until the end of the addition of the nitric acid solution was within the range of 15 to 45° C., thus maintained at 50° C. or lower.

The obtained mixture was filtered by a Nutsche type filter device followed by washing, thereby separating the precipitate from the solution. The obtained solution amounted 4500 ml. By gravimetric analysis and ICP atomic emission spectrochemical analysis, it was revealed that rare earth elements were dissolved in the solution in the yield of 98.6%. On the other hand, the separated precipitate, which contained nickel oxyhydroxide, was dissolved in hydrochloric acid, and undissolved residue was filtered off, thereby obtaining 2767 ml of a chloride solution having the concentration of 107.6 g/liter. The composition of the chloride solution was 68.5 wt % of nickel, 15.8 wt % of cobalt, and 0.75 wt % of rare earth elements. It was found that this chloride solution could be subjected as it was to recovery of nickel and cobalt since this solution contained only a small amount of rare earth elements.

The solution obtained above by separating from the precipitate was divided into two portions, one of which was subjected to recovery using a fluorine compound, and the other of which was subjected to recovery using oxalic acid, as will be described below.

Recovery Using Fluorine Compound 2000 ml of the above solution was charged into a stirring vessel, and mixed with 245 ml of acid an ammonium fluoride solution having the concentration of 200 g/liter to precipitate rare earth fluorides. The precipitate was separated by filtration, washed, and dried at 600° C., thereby obtaining 103.5 g of rare earth fluorides. The filtrate from which the precipitate had been separated and the wash solution were collected, and mixed with 156 g of caustic soda, thereby precipitating cobalt hydroxide and nickel hydroxide, which were then separated by filtration. The obtained cobalt hydroxide and nickel hydroxide were washed, and dissolved in hydrochloric acid, to obtain 1500 ml of a mixed solution of cobalt chloride and nickel chloride having the concentration of 110 g/liter. Purity and recovery ratio of the rare earth elements are shown in Table 1.

Recovery Using Oxalic Acid 2000 ml of the above solution was charged into a stirring vessel, and mixed with 563 ml of an oxalic acid solution having the concentration of 150 g/liter to form a precipitate. Further, pH of the mixed solution was adjusted to 4 with a caustic soda solution to precipitate rare earth oxalates. The precipitate was separated by filtration, washed, and calcined at 1000° C., thereby obtaining 86.3 g of rare earth oxides. The filtrate from which the oxalates had been separated was mixed with 120 g of caustic soda to precipitate cobalt hydroxide and nickel hydroxide, which were then separated by filtration. The separated precipitate was washed, and dissolved in hydrochloric acid, to obtain 1640 ml of a mixed solution of cobalt chloride and nickel chloride having the concentration of 103 g/liter. Purity and recovery ratio of the rare earth elements are shown in Table 1.

Example 2

Anode metal sludge of used nickel-hydrogen rechargeable batteries having the metallic composition of 33.4 wt % of rare earth elements in the form of misch metal (mixed rare earth metals), 49.9 wt % of nickel, 9.6 wt % of cobalt, 1.9 wt % of aluminum, and 5.2 wt % of manganese, was measured out to contain 500 g of metallic components. The particle size of the sludge was measured by MICROTRAC PARTICLE-SIZE ANALYZER to reveal that the average particle size of the sludge was 14 $\mu$m. Thus, the sludge was charged as it was into a dissolving vessel fitted with a stirrer, and mixed with water to prepare 1 liter of a slurry of the sludge. Then a 5 N nitric acid solution was added to and dissolved in the slurry at the rate of 5 ml/min. under stirring. After 1 hour from the start of the addition, the temperature of the mixture exceeded 40° C., so that the addition of the nitric acid solution was stopped, and the dissolving reaction was continued only by stirring. After the lapse of 1 hour of stirring, the temperature of the mixture declined to 35° C., and thus the addition of the nitric acid solution was resumed at the rate of 5 ml/min. When the pH of the mixture was declined to 5.5, the addition of the nitric acid solution was stopped. Only the stirring was continued for additional two hours, and the reaction was completed. The total amount of the nitric acid solution added to the slurry was 3030 ml. The pH of the mixture from the start until the end of the addition of the nitric acid solution was maintained at 5 or higher. The temperature of the mixture from the start until the end of the addition of the nitric acid solution was within the rage of 15 to 45° C., thus maintained at 50° C. or lower.

The obtained mixture was filtered by a Nutsche type filter device followed by washing, thereby separating the precipitate from the solution. The obtained solution amounted 4800 ml. By gravimetric analysis and ICP atomic emission spectrochemical analysis, it was revealed that rare earth elements were dissolved in the solution in the yield of 98.3%. 4600 ml of this solution was measured out, and mixed with 1040 g of powdered ammonium hydrogencarbonate, while simultaneously adjusting the pH of the mixture to 6 with aqueous ammonia, thereby precipitating carbonates. The precipitate was separated by filtration, washed, and calcined at 700° C. to obtain 427.6 g of oxides. The composition of the oxides was 42.2 wt % of rare earth oxides, 42.0 wt % of nickel oxide, 8.4 wt % of cobalt oxide, and 7.4 wt % of manganese oxide. The oxides were mixed with 423 g of fresh rare earth oxides, charged into a bath salt for molten salt electrolysis of rare earth metals having the composition of $RF_3$:LiF:$BaF_2$= 1:0.3:0.2 by weight, and electrolyzed at 930° C., thereby obtaining 649.1 g of a rare earth metal master alloy. The composition of the master alloy was 73.6 wt % of rare earth metals, 19.5 wt % of nickel, 4.1 wt % of cobalt, and 2.8 wt % of manganese. The obtained master alloy was suitable for use in producing an alloy for use as an anode of a nickel-hydrogen rechargeable battery. Purity and recovery ratio of the rare earth oxides, mixing ratio of the fresh rare earth oxides, recovery ratio of the rare earth metals, and content of chlorine in the rare earth metals were measured. The results are shown in Table 2.

Example 3

Slug generated during production of a rare earth-nickel hydrogen storage alloy was coarsely crushed, and further pulverized in a wet ball mill into the average particle size of 18 $\mu$m. The obtained powders were charged into a dissolving vessel fitted with a stirrer, and mixed with water to prepare 1 liter of a slurry. The slurry was analyzed and revealed that the metallic composition thereof is 36.3 wt % of rare earth elements, 44.1 wt % of nickel, 11.0 wt % of cobalt, 1.3 wt % of aluminum, and 7.3 wt % of manganese, and that the total weight of the metallic components was 500 g. A 5 N nitric acid solution was added to and dissolved in the slurry at the rate of 4 ml/min. under stirring. After 50 minutes from the start of the addition, the temperature of the mixture exceeded 40° C., so that the addition of the nitric acid solution was stopped, and the dissolving reaction was continued only by stirring for 2 hours. When the temperature of the mixture declined to 35° C., the addition of the nitric acid solution was resumed at the rate of 5 ml/min. When the pH of the mixture was declined to 5.5, the addition of the nitric acid solution was stopped. Only the stirring was continued for additional 2 hours, and the reaction was completed. The total amount of the nitric acid solution added to the slurry was 3070 ml. The pH of the mixture from the start until the end of the addition of the nitric acid solution was maintained at 5 or higher. The temperature of the mixture from the start until the end of the addition of the nitric acid solution was within the range of 15 to 45° C., thus maintained at 50° C. or lower.

The obtained mixture was filtered by a Nutsche type filter device followed by washing, thereby separating the precipitate from the solution. The obtained solution amounted 5000 ml. By gravimetric analysis and ICP atomic emission spectrochemical analysis, it was revealed that rare earth elements were dissolved in the solution in the yield of 99.0%. On the other hand, the separated precipitate, which contained nickel oxyhydroxide, was dissolved in hydrochloric acid, and undissolved portion was filtered off, thereby obtaining 2280 ml of a chloride solution having the concentration of 122.4 g/liter. The composition of the chloride solution was 67.1 wt % of nickel, 15.5 wt % of cobalt, and 0.6 wt % of rare earth elements. It was found that this chloride solution could be subjected as it was to recovery of nickel and cobalt since this solution contained only a trace amount of rare earth elements.

The solution obtained above by separating from the precipitate was divided into two portions, and subjected to recovery using a fluorine compound and recovery using oxalic acid, respectively, as in Example 1. The results are shown in Table 1.

Comparative Example 1

The anode metal sludge of used nickel-hydrogen rechargeable batteries as used in Example 1 was measured out to contain 500 g of metallic components. The sludge was charged into a dissolving vessel fitted with a stirrer, and mixed with water to prepare 1 liter of a slurry of the sludge. Then 3000 ml of a 7.5 N nitric acid solution (volume ratio of concentrated nitric acid to water is 1:0.93), which was 1.1 times the theoretical amount required for dissolving the soluble metals (rare earth metals, cobalt, and the like), was added to and dissolved in the slurry under the condition of pH 5 or lower. The dissolving reaction was accompanied by generation of NO gas, which required washing and removal. Further, entire metals contained in the slurry was dissolved as nitrates, and trace amount of undissolved residue was filtered out. The obtained filtrate solution was mixed with 125 g of powdered ammonium fluoride, and adjusted to pH 4 with caustic soda, thereby precipitating rare earth fluorides. The precipitate was separated by filtration, washed, and dried at 600° C., thereby obtaining 109.8 g of rare earth fluorides. On the other hand, The filtrate from which the precipitate had been separated and the wash solution were collected, and neutralized with caustic soda, thereby precipitating nickel, cobalt, aluminum, and manganese as hydroxides, which were then separated by filtration. The obtained precipitate was washed, and dissolved in hydrochloric acid, to obtain 664 ml of a mixed chloride solution having the concentration of 112 g/liter. Purity and recovery ratio of the rare earth 10 elements are shown in Table 1.

Comparative Example 2

The anode metal sludge of used nickel-hydrogen rechargeable batteries as used in Example 1 was measured out to contain 500 g of metallic components. The sludge was charged into a dissolving vessel fitted with a stirrer, and mixed with water to prepare 1 liter of slurry of the sludge. Then 2822 ml of 6 N hydrochloric acid was added to and dissolved in the slurry. The obtained mixture generated hydrogen gas, and thus careful discharge of the hydrogen gas was necessitated. The entire metals contained in the sludge were dissolved in the mixture as chlorides. Trace amount of undissolved residue in the mixture was filtered out. The obtained filtrate solution was mixed with 1580 g of powdered ammonium hydrogencarbonate, and simultaneously adjusted to pH 6 with aqueous ammonia, thereby precipitating carbonates. The precipitate was separated by filtration, washed, and calcined at 700° C., thereby obtaining 621.6 g of oxides. The composition of the oxides was 31.1 wt % of rare earth oxides, 46.0 wt % of nickel oxide, 11.5 wt % of cobalt oxide, 1.9 wt % of aluminum oxide, and 9.5 wt % of manganese oxide. The oxides were mixed with 877 g of fresh rare earth oxides, charged into the molten salt bath as used in Example 2, and electrolyzed under the same conditions as in Example 2, thereby obtaining 1060 g of a rare earth-nickel master alloy. The composition of the master alloy was 73.7 wt % of rare earth metals, 18.4 wt % of nickel, 4.5 wt % of cobalt, 0.4 wt % of aluminum, and 3.0 wt % of manganese. The obtained master alloy contained 0.15 wt % of chlorine, and thus was decided not to be suitable for use in producing an alloy for use as an anode of a nickel-hydrogen rechargeable battery. The same measurements as in Example 2 were made. The results are shown in Table 2.

TABLE 1

|  | Generation of Gas During Dissolving | Amount of $HNO_3$ Used per mol of R (mol/mol) | Method of Recovery | Purity of Rare Earth Elements (%) | Recovery Ratio of Rare Earth Elements (%) |
| --- | --- | --- | --- | --- | --- |
| Example 1 | None | 13.1 | Recovery with Fluorine Compound | 98.2 | 96.6 |
|  |  |  | Recovery with Oxalic Acid | 98.7 | 96.8 |
| Example 3 | None | 12.0 | Recovery with Fluorine Compound | 98.5 | 98.0 |

TABLE 1-continued

|  | Generation of Gas During Dissolving | Amount of $HNO_3$ Used per mol of R (mol/mol) | Method of Recovery | Purity of Rare Earth Elements (%) | Recovery Ratio of Rare Earth Elements (%) |
|---|---|---|---|---|---|
| Comp. Ex. 1 | NO gas generated | 20.7 | Recovery with Oxalic Acid | 99.0 | 97.7 |
|  |  |  | Recovery with Fluorine Compound | 96.3 | 92.4 |

Note: In the Table, R represents rare earth elements.

TABLE 2

|  | Generation of Gas During Dissolving | Method of Recovery | Purity of R oxides (%) | Recovery Ratio of R Oxides (%) | Mixing Ratio of Fresh R Oxides For Electrolysis | Recovery Ratio of R (%) | Content of Chlorine in R wt (%) |
|---|---|---|---|---|---|---|---|
| Ex. 2 | None | Recovery with Carbonate | 42.2 | 98.8 | 0.99 times | 92.0 | Not Detected |
| Comp. Ex. 2 | $H_2$ generated | Recovery with Carbonate | 31.1 | 98.0 | 1.41 times | 85.0 | 0.13 |

Note: In the table, R represents rare earth metals.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A method for recovering reusable elements including rare earth elements from a rare earth-nickel alloy comprising steps of:

preparing a slurry of the rare earth-nickel alloy, adding a diluted nitric acid solution wherein said nitric acid solution has a concentration of not higher than 39% by weight to said slurry under stirring at a temperature not higher than 50° C. while the pH of said slurry is maintained at 5 or higher to dissolve soluble metals including rare earth metals, thereby obtaining a rare earth-containing nitrate solution containing an undissolved residue containing nickel, and separating said undissolved residue containing nickel from said rare earth-containing nitrate solution by filtration.

2. The method as claimed in claim 1 wherein said rare earth-nickel alloy is selected from the group consisting of waste of rare earth-nickel alloy, a powdered anode material of nickel-hydrogen rechargeable battery, rare earth-nickel alloy slug, and mixtures thereof.

3. The method as claimed in claim 1 wherein said rare earth-nickel alloy contains a rare earth metal, nickel, and a metal selected from the group consisting of Co, Al, Mg, Ti, Cr, Mo, W, Ga, Hf, Zr, and mixtures thereof.

4. The method as claimed in claim 1 further comprising the steps of:

adding a fluorine compound to said separated rare earth-containing nitrate solution to precipitate rare earth fluorides, and separating said precipitated rare earth fluorides from the nitrate solution containing residual metals by filtration.

5. The method as claimed in claim 4 wherein said fluorine compound is selected from the group consisting of an acidic ammonium fluoride solution, a hydrofluoric acid solution, and mixtures thereof, each having a concentration of 0.5 to 5 N.

6. The method as claimed in claim 4 wherein an amount of said fluorine compound added to said rare earth-containing nitrate solution is 1.1 to 1.3 equivalent of rare earth elements contained in said rare earth-containing nitrate solution in terms of fluoride ions contained therein.

7. The method as claimed in claim 4 further comprising the step of drying said precipitated and separated rare earth fluorides to obtain rare earth fluoride anhydrides.

8. The method as claimed in claim 1 further comprising the steps of:

adding a component selected from the group consisting of oxalic acid, ammonium oxalate, and mixtures thereof to said separated rare earth-containing nitrate solution to precipitate rare earth oxalates, and separating said precipitated rare earth oxalates from the nitrate solution containing residual metals by filtration.

9. The method as claimed in claim 8 wherein an amount of said component is 1.1 to 1.3 equivalent of rare earth elements contained in said rare earth-containing nitrate solution.

10. The method as claimed in claim 8 further comprising the step of calcining said precipitated and separated rare earth oxalates to obtain rare earth oxides.

11. The method as claimed in claim 1 further comprising the steps of:

adding a component selected from the group consisting of ammonium hydrogencarbonate, ammonium carbonate, alkali carbonate, and mixtures thereof to said separated rare earth-containing nitrate solution to precipitate rare earth elements and transition metals contained in the rare earth-containing nitrate solution as carbonates, respectively, separating said precipitate by filtration, calcining said precipitate to obtain an oxide, mixing said oxide with additional rare earth oxides so that a weight ratio of rare earth elements to transition metals including nickel in a resulting mixture is 50:50 to 90:10, subjecting said mixture to molten salt electrolysis in a fluoride bath to obtain a rare earth-nickel master alloy.

12. The method as claimed in claim 11 wherein an amount of said component is 1.1 to 1.5 equivalent of the amount required for precipitating all metal ions contained in said rare earth-containing nitrate solution.

13. The method as claimed in claim 11 wherein said fluoride bath is a mixed salt of rare earth fluorides ($RF_3$), lithium fluoride (LiF), and barium fluoride ($BaF_2$), with a mixing ratio of $RF_3$:LiF:$BaF_2$=1:0.1 to 0.4:0.08 to 0.3 by weight.

14. The method as claimed in claim 11 wherein said step of subjecting said mixture to molten salt electrolysis is carried out at 700 to 1000° C.

* * * * *